United States Patent
Gorman et al.

(10) Patent No.: US 9,702,531 B2
(45) Date of Patent: Jul. 11, 2017

(54) RETROFIT SYSTEM AND METHOD FOR REPLACING LINEAR FLUORESCENT LAMP WITH LED MODULES

(71) Applicant: General LED, Inc., San Antonio, TX (US)

(72) Inventors: Aaron Gorman, New Braunfels, TX (US); Gray Lankford, San Antonio, TX (US)

( * ) Notice: Subject to any disclaimer, the term of this patent is extended or adjusted under 35 U.S.C. 154(b) by 171 days.

(21) Appl. No.: 14/694,515

(22) Filed: Apr. 23, 2015

(65) Prior Publication Data

US 2015/0308631 A1    Oct. 29, 2015

Related U.S. Application Data

(60) Provisional application No. 61/983,140, filed on Apr. 23, 2014, provisional application No. 62/099,722, filed on Jan. 5, 2015.

(51) Int. Cl.

| | |
|---|---|
| *F21V 19/00* | (2006.01) |
| *F21V 15/01* | (2006.01) |
| *F21S 4/28* | (2016.01) |
| *F21K 9/27* | (2016.01) |
| *F21W 131/405* | (2006.01) |
| *F21V 17/00* | (2006.01) |
| *F21Y 103/10* | (2016.01) |
| *F21Y 115/10* | (2016.01) |

(52) U.S. Cl.
CPC ............ *F21V 19/003* (2013.01); *F21K 9/27* (2016.08); *F21S 4/28* (2016.01); *F21V 15/013* (2013.01); *F21V 17/002* (2013.01); *F21W 2131/405* (2013.01); *F21Y 2103/10* (2016.08); *F21Y 2115/10* (2016.08); *Y02B 20/386* (2013.01)

(58) Field of Classification Search
CPC .. F21K 9/27; F21S 4/28; F21V 15/013; F21V 17/002; F21V 19/003; F21W 2131/405; F21Y 2103/10; F21Y 2115/10; Y02B 20/386
See application file for complete search history.

(56) References Cited

U.S. PATENT DOCUMENTS

| | | | |
|---|---|---|---|
| 6,871,983 B2 * | 3/2005 | Jacob | F21S 8/04 362/147 |
| 7,490,957 B2 | 2/2009 | Leong et al. | |
| 7,926,977 B2 | 4/2011 | Nall et al. | |
| 8,115,411 B2 | 2/2012 | Shan | |
| 8,474,998 B2 | 7/2013 | Wang et al. | |
| 8,791,650 B2 | 7/2014 | Shan | |
| 9,133,986 B2 | 9/2015 | Wang et al. | |
| 9,179,513 B2 | 11/2015 | Shan | |
| 9,228,727 B2 * | 1/2016 | May | F21S 8/04 |
| 2013/0094225 A1 * | 4/2013 | Leichner | F21S 2/005 362/368 |
| 2015/0184807 A1 | 7/2015 | Vincent | |
| 2015/0211688 A1 | 7/2015 | Shan | |

* cited by examiner

*Primary Examiner* — Stephen F Husar
(74) *Attorney, Agent, or Firm* — William H. Quirk; Jesse Frizzell; Rosenthal Pauerstein Sandoloski Agather LLP

(57) ABSTRACT

A system for replacing linear fluorescent lamps with LED modules in a cabinet sign includes an LED module support structure. The LED module support structure may be attached to the raceways of the cabinet sign or to the sockets formerly used for mounting fluorescent lamps between the raceways.

17 Claims, 14 Drawing Sheets

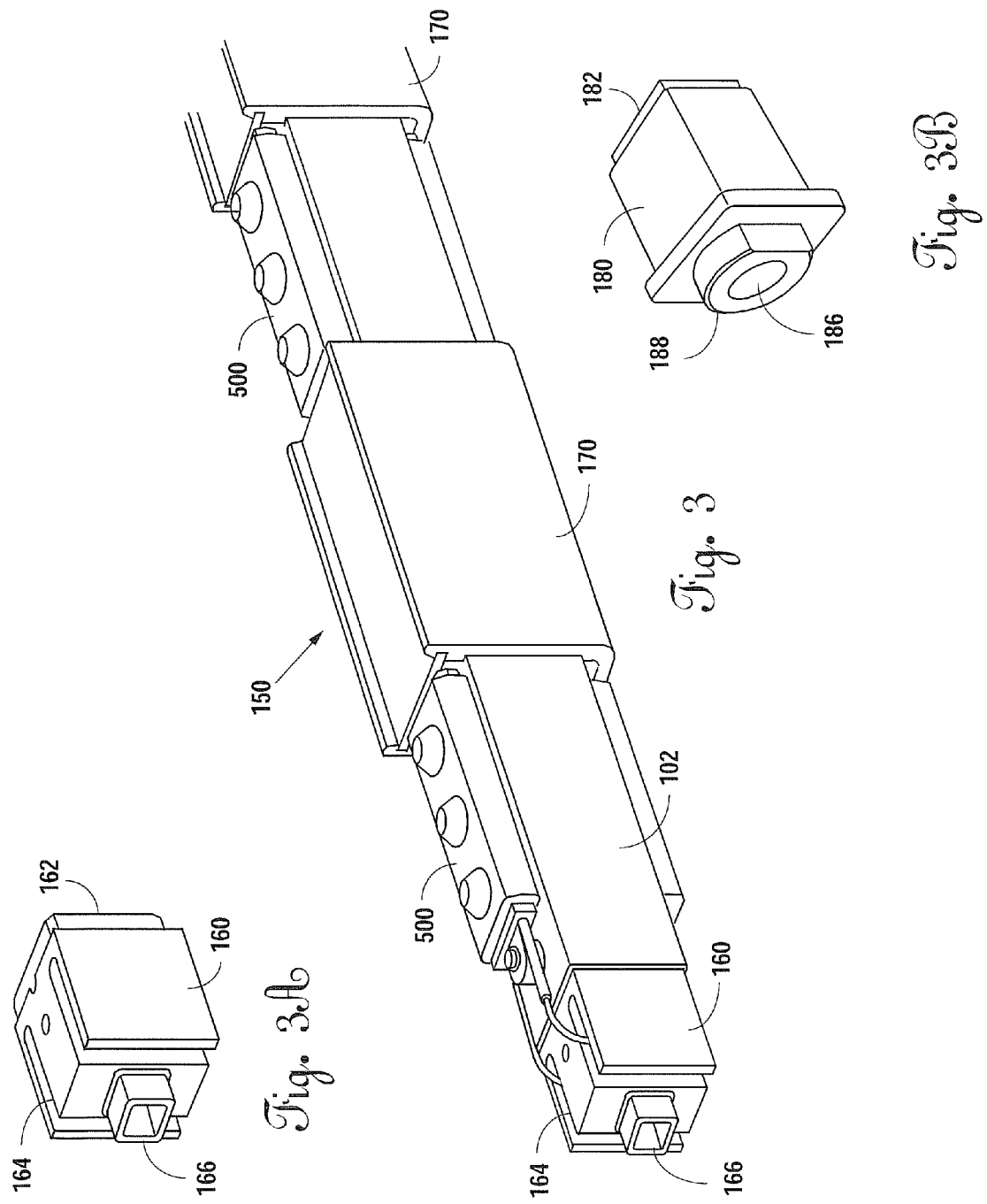

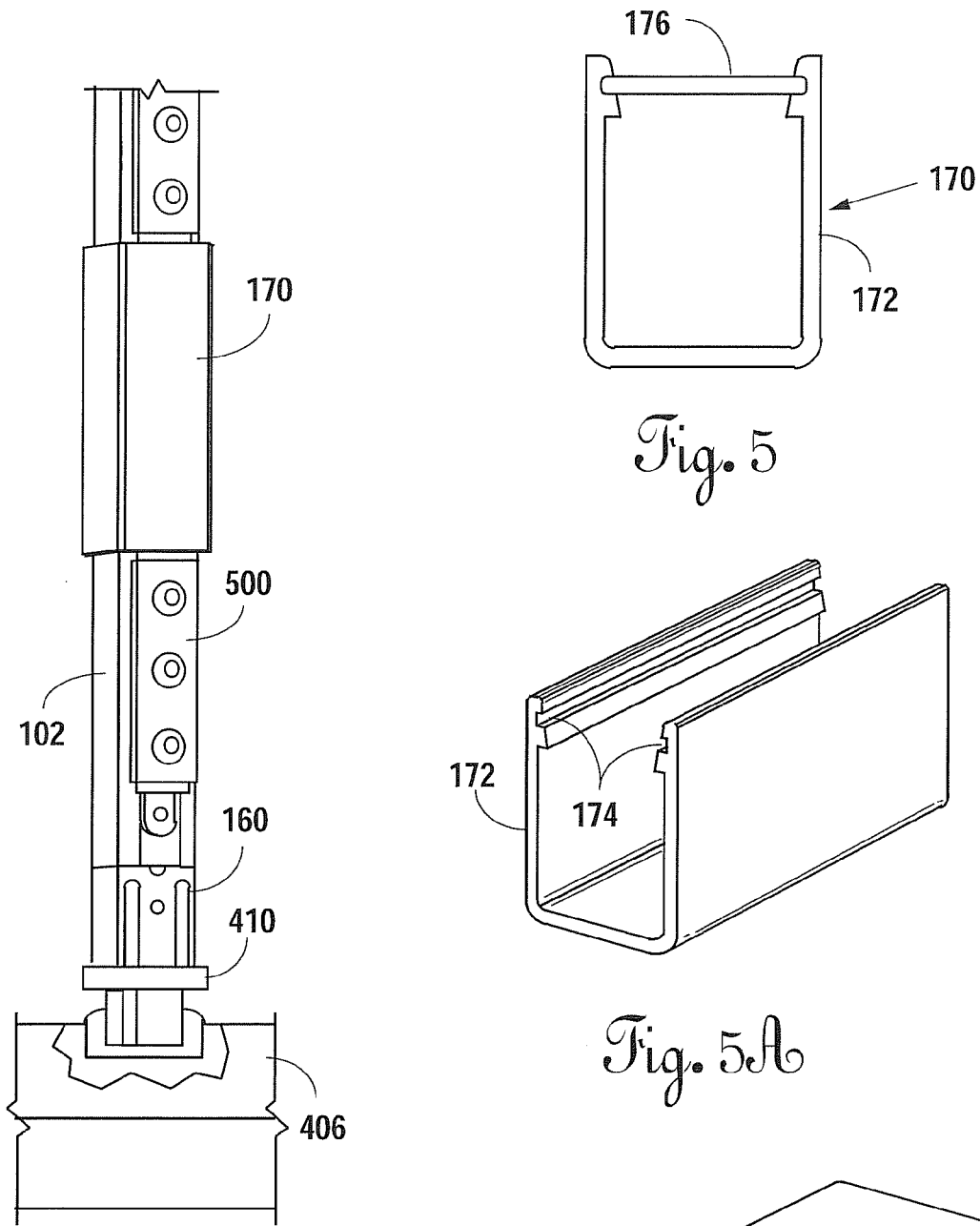

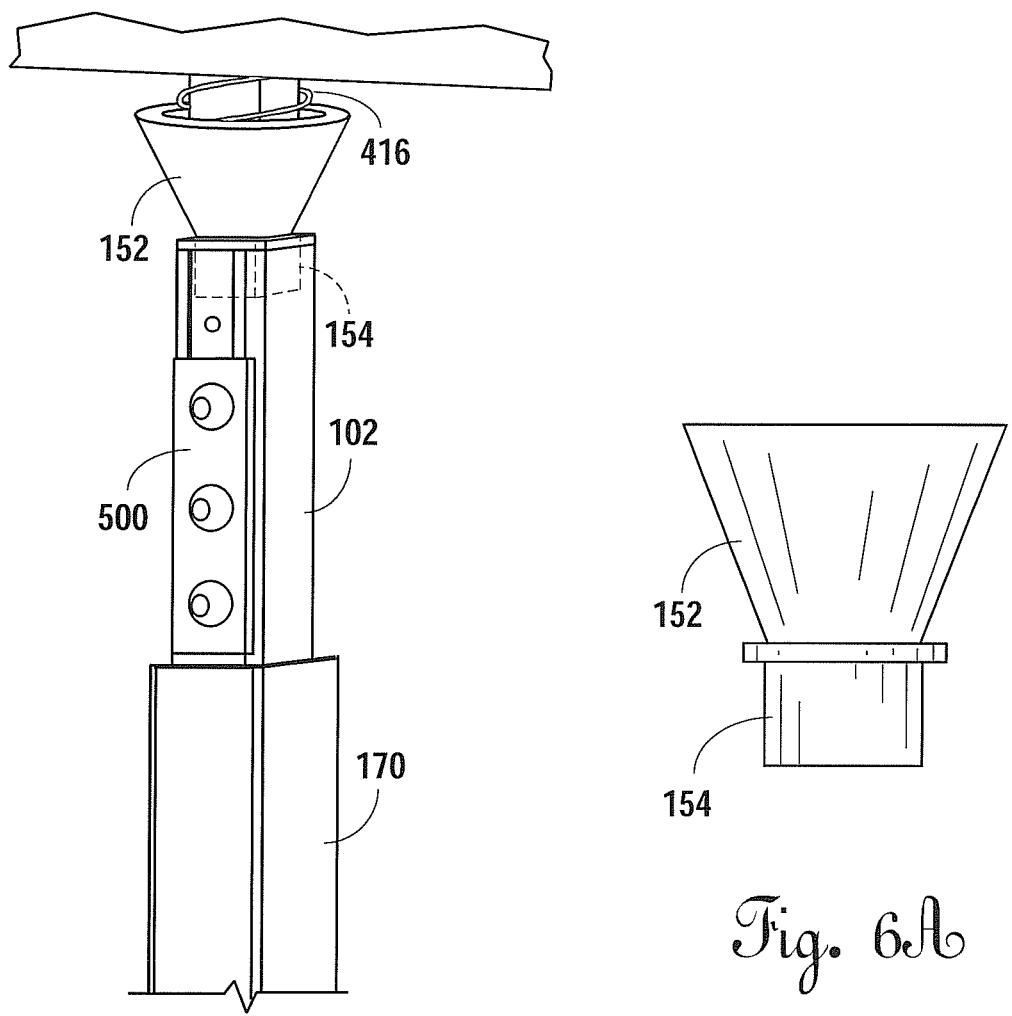

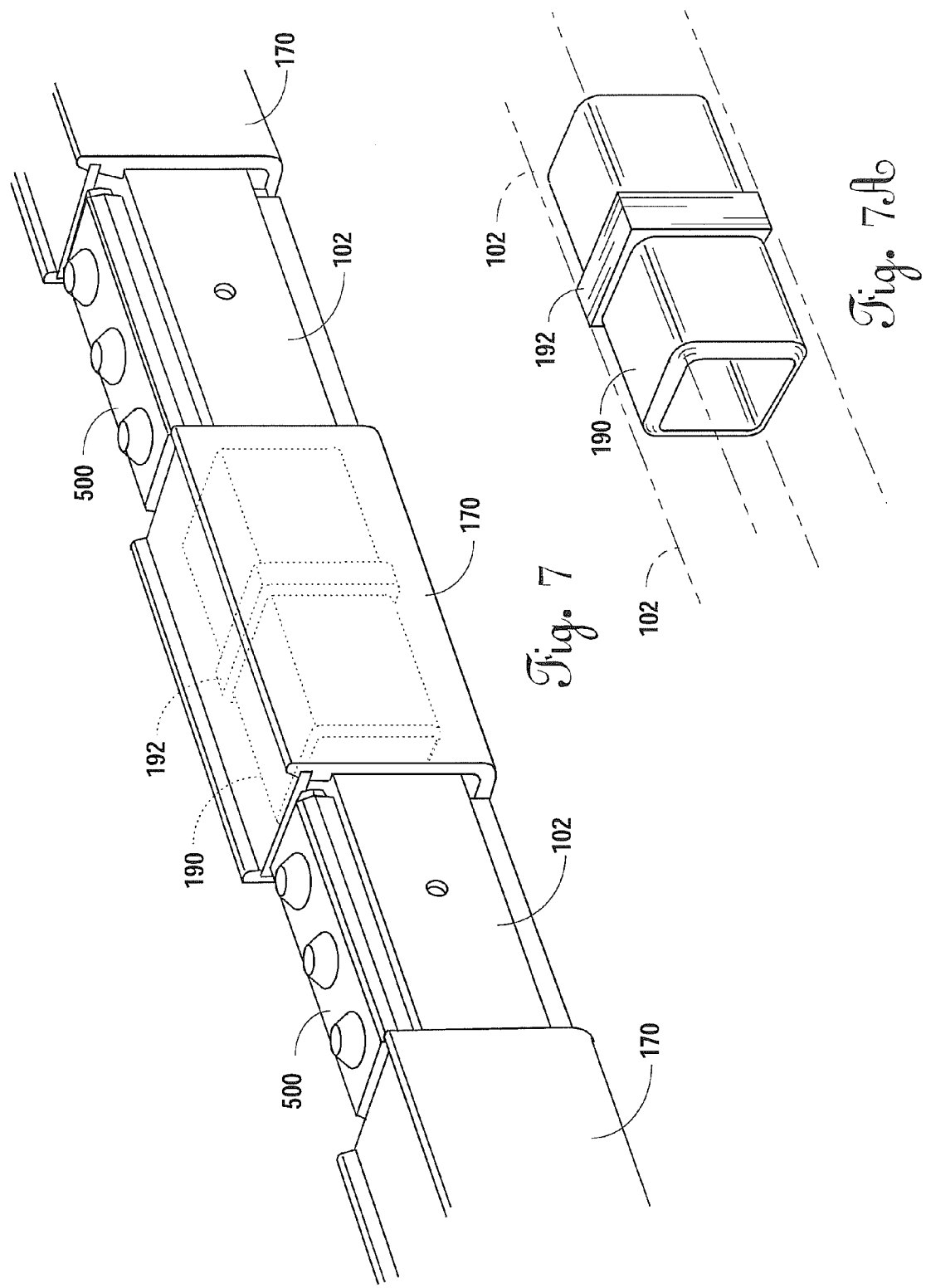

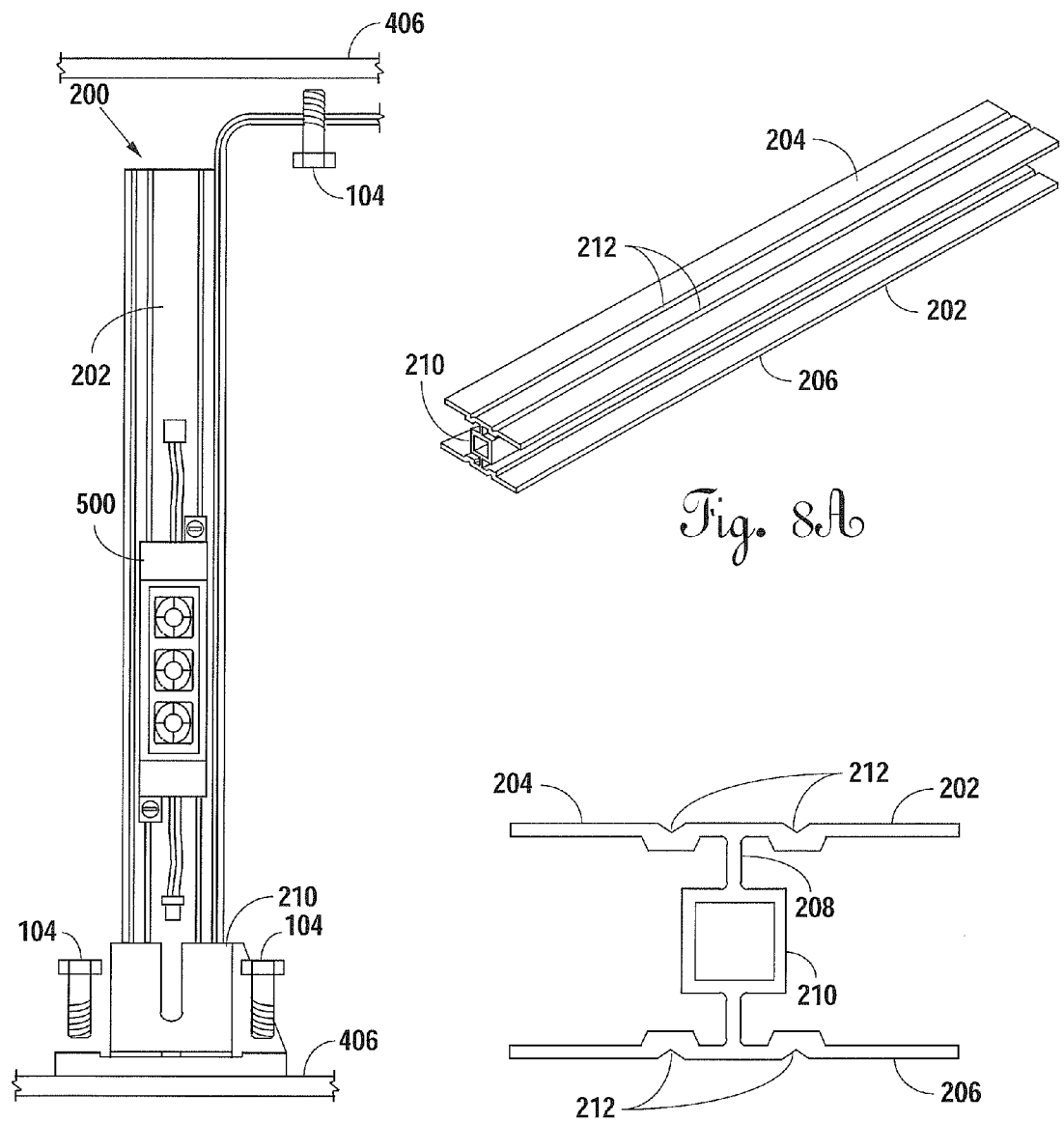
Fig. 8
Fig. 8A
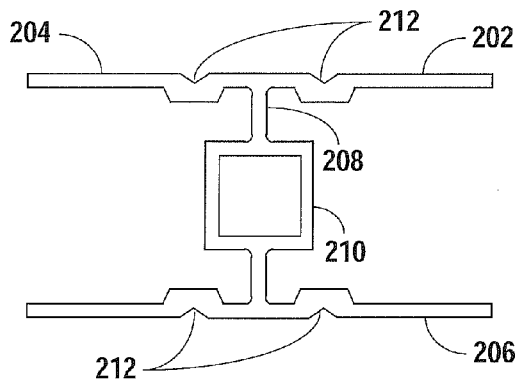
Fig. 8B

RETROFIT SYSTEM AND METHOD FOR REPLACING LINEAR FLUORESCENT LAMP WITH LED MODULES

CROSS REFERENCE TO RELATED PATENT APPLICATIONS

This application claims the benefit of Provisional U.S. Patent Application No. 61/983,140 filed Apr. 23, 2014 and Provisional U.S. Patent Application No. 62/099,722 filed Jan. 5, 2015.

FIELD

The present invention pertains to the mounting of LED light systems; more particularly, the present invention pertains to systems and methods for replacing linear fluorescent lamps in cabinet signs with LED modules.

BACKGROUND

Linear fluorescent lamps have been the light source of choice for commercial applications, to include signage, in the United States and other countries for much of the twentieth century. The many types of linear fluorescent lamps currently range from a nominal size of less than one foot to a nominal size of ten feet. Because of the many standard sizes of linear fluorescent lamps in commercial lighting, commercial signage is designed around the nominal length of the linear fluorescent lamps.

In commercial signage, linear fluorescent lamps are often mounted in a parallel fashion in what is known in the industry as cabinet signs. The structure of the interior of the prior art cabinet signs provides mounting points, typically the two fluorescent lamp sockets, between which each linear fluorescent lamp is placed. The two sockets both hold the linear fluorescent lamps in position and enable a female electrical connection to the prongs which extend outwardly from the ends of the linear fluorescent lamps. To accommodate small variations in the lengths of linear fluorescent lamps, one of the sockets, typically the socket at the top of the cabinet sign, includes a spring to assure that the linear fluorescent lamp is held in place and that a suitable electrical connection is established.

While it is generally cheaper to operate linear fluorescent lamps than the incandescent light bulbs that linear fluorescent lamps replaced, the continuing increases in the cost of electrical energy have resulted in the need for a source of light energy that is cheaper to operate and more reliable than linear fluorescent lamps.

Several decades ago LEDs became available as a lighting source. Initially, the low light output of LEDs limited their use to indicator lights typically used with electronic control systems. Since the initial introduction of LEDs their output of light energy has increased to where the light output of LEDs rivals the light output of both incandescent light bulbs and linear fluorescent lamps. In addition to being less expensive to operate than linear fluorescent lamps, LEDs have a much longer life; thus, the operational cost of LEDs per unit of time is much less than systems using conventional linear fluorescent lamps.

LEDs also provide other features not found in systems using linear fluorescent lamps. Those features include color and flexibility. Most linear fluorescent lamps emit white or off-white illumination. LEDs emit light in multiple colors. Further, LEDs are typically provided in modules, which LED modules are connected one to another by wires. Thus, for commercial lighting designers, LEDs provide more flexibility and less cost over time.

Since fluorescent lighting has been around for more than half a century there are many cabinet signs designed for fluorescent lamps which are still serviceable and will remain serviceable for many years to come. Rather than building entirely new signage structures for the use of LED lights, the need has developed in commercial lighting applications for a system and method to replace linear fluorescent lamps with LED modules in existing prior art cabinet signs designed and built for the mounting of linear fluorescent lamps.

SUMMARY

The disclosed system and method for replacing linear fluorescent lamps with LED modules in existing prior art cabinet signs designed and built for the mounting of linear fluorescent lamps in sockets between raceways includes an LED module support structure. The LED module support structure may be attached to the raceways within the prior art cabinet signs or to the fluorescent lamp sockets mounted in the raceways.

In one embodiment, the LED module support structure is a hollow extrusion which may be directly attached to the raceways within the prior art cabinet sign. In another embodiment, the hollow extrusion LED module support structure may be connected to the raceways within the prior art cabinet sign with a three sided connector. In yet another embodiment, the hollow extrusion LED module support structure is used to engage the sockets formerly used to support and provide electrical power to the linear fluorescent lamps.

In still another embodiment, the LED module support structure is an extrusion having a cross section including flanges, a single or double web therebetween and a central opening formed in the web. The extrusion may be directly attached to the raceways, connected to the raceways with a three sided connector or formed to engage one or both of the sockets formerly used to support and provide electrical power to the linear fluorescent lamps.

In still yet another embodiment the LED modules support structure is a pair of substantially flat strips positioned in a substantially H-shaped holder. One end of the pair of substantially flat strips is formed into a grappling yoke for frictional engagement with the sides of the raceway.

BRIEF DESCRIPTION OF THE DRAWING FIGURES

A better understanding of the disclosed system for replacing linear fluorescent lamps in a cabinet sign may be had by reference to the drawing figures wherein:

FIG. 3 is a perspective view of the bottom of a second version of the first embodiment;

FIG. 3A is a perspective view of an adapter shown in FIG. 3;

FIG. 3B is a perspective view of an alternate embodiment of the adapter shown in in FIG. 3A;

FIG. 4 is a perspective view of the embodiment shown in FIG. 3 showing engagement with a fluorescent lamp socket;

FIG. 5 is a side elevational view of a wire cover which fits over the extruded hollow LED module support structure;

FIG. 5A is a perspective view of the U-shaped portion of the wire cover shown in FIG. 5;

FIG. 5B is a perspective view of the plate shown in FIG. 5;

FIG. 6 is a perspective view of the top of the embodiment shown in FIG. 3;

FIG. 6A is a side elevational view of the substantially hollow conical connector shown in FIG. 6;

FIG. 7 is a perspective view of the connection of two sections of the extruded hollow LED module support structure;

FIG. 7A is a perspective view of the block used in FIG. 7;

FIG. 8 is a side elevational view of the second embodiment of the disclosed system;

FIG. 8A is a perspective view of one version of the extruded hollow LED module support structure used in the second embodiment;

FIG. 8B is a cross sectional view of the extruded hollow LED module support structure shown in FIG. 8A;

DESCRIPTION OF THE EMBODIMENTS

A better understanding of the disclosed system and method may be had from an understanding of prior art cabinet signs in which linear fluorescent lamps provide illumination behind one or two translucent panels. The translucent panels are typically mounted in a frame whose dimensions are determined primarily by the length of the linear fluorescent lamps used in the prior art cabinet signs.

Figure 1:
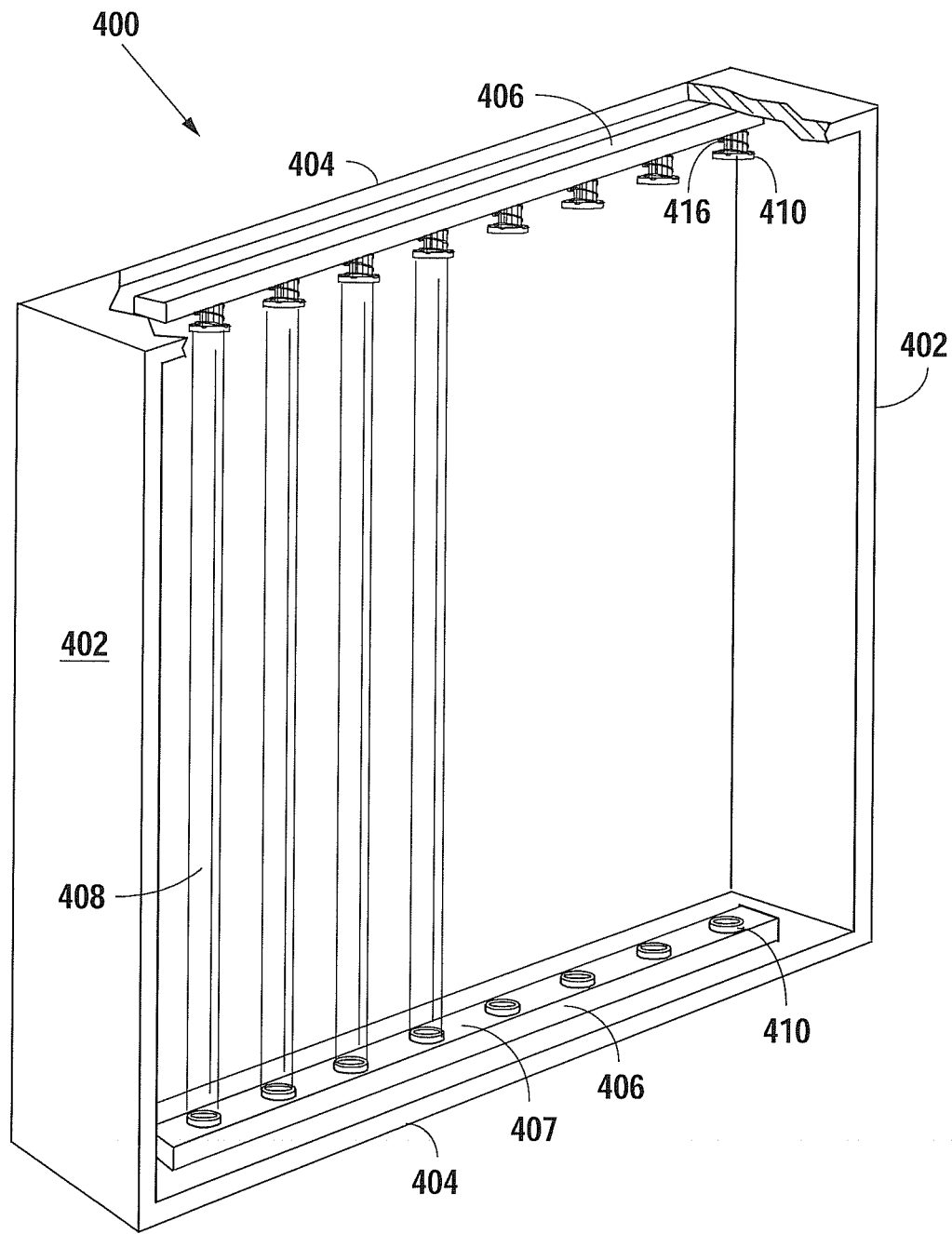
FIG. 1 is a perspective view of a prior art cabinet sign designed for the use of linear fluorescent lamps as an illumination source.

Shown in FIG. 1 is a perspective view of a prior art cabinet sign 400 with the translucent panels removed. Structurally, the illustrated cabinet sign 400 has two side walls 402 and two end walls 404 which hereinafter will be both be described as end walls. In some prior art cabinet signs the linear fluorescent lamps are mounted substantially horizontally and in other prior art cabinet signs the linear fluorescent lamps are mounted substantially vertically as shown by the four linear fluorescent lamps 408 on the left side of FIG. 1. Attached to the end walls 404 are raceways 406 which contain fluorescent lamp sockets 410.

The fluorescent lamp sockets 410 both physically mount and provide electrical energy to the linear fluorescent lamps 408. As shown in FIG. 1 the fluorescent lamp sockets 410 at the bottom of the cabinet sign 400 are affixed to the raceway 406. However, the fluorescent lamp sockets 410 in the raceway 406 at the top of the cabinet sign 400 include a movable, spring bias 416 mounting. This is because the lengths of all linear fluorescent lamps are not exactly the same and some movement must be provided for this variation in length.

As will be explained below, when converting a prior art cabinet sign 400, which was previously illuminated by linear fluorescent lamps, to a sign illuminated by LED modules, the raceways 406 will be left in place.

Figure 2:
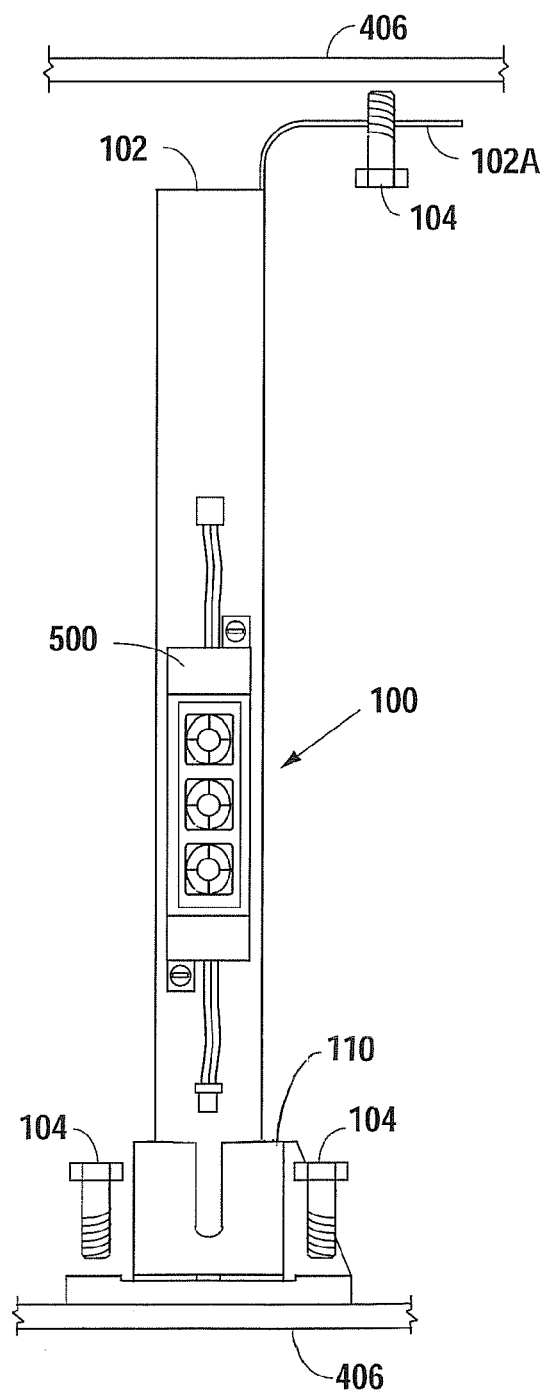
FIG. 2 is a side elevational view of a first embodiment of the disclosed system.
Figure 2A:
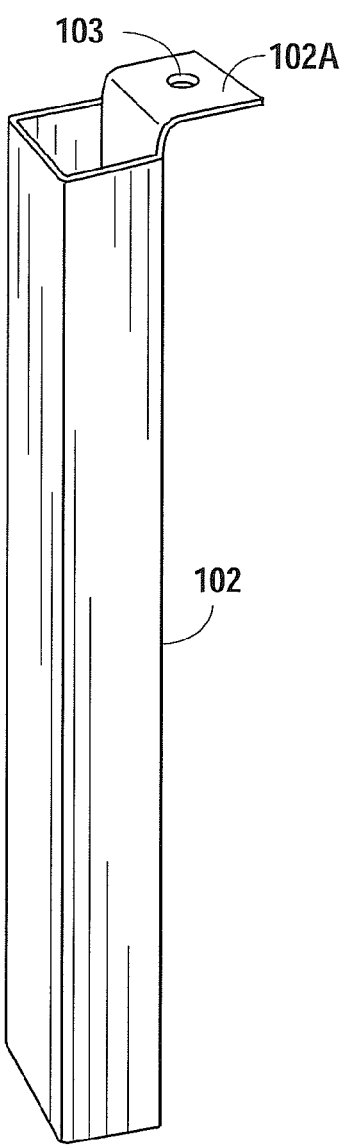
FIG. 2A, FIG. 2B and FIG. 2C are perspective views of the extruded hollow LED module support structure showing mounting tabs formed on the ends thereof.

Shown in FIG. 2 is a first embodiment 100 of the disclosed system. Herein, both raceways 406 have been left in place. The main structural portion of the first embodiment is an extruded hollow LED module support structure 102 which is cut substantially to the length of the linear fluorescent tube that will be replaced. As shown in FIG. 2A, the extruded hollow LED module support structure 102 is preferably a substantially square extrusion; however, an extrusion having a rectangular cross section or a cross section in the shape of a parallelogram may also be used. The generic term used herein for the geometry of these cross sections is a parallelepiped. LED modules 500 are connected to the extruded hollow LED module support structure 102 as shown in FIG. 2.

Also shown in FIG. 2A is that three walls of the extruded hollow LED module support structure 102 may be removed to leave a mounting tab 102A. This mounting tab 102A is shown at the top of FIG. 2. Herein, a hole 103 is formed the in the mounting tab 102 and a threaded fastener 104 can be used to secure the tab 102 to the raceway 406 of the cabinet sign 400 in that part 407 (FIG. 1) of the raceway 406 between the sets of fluorescent lamp sockets 410.

Figure 2B:
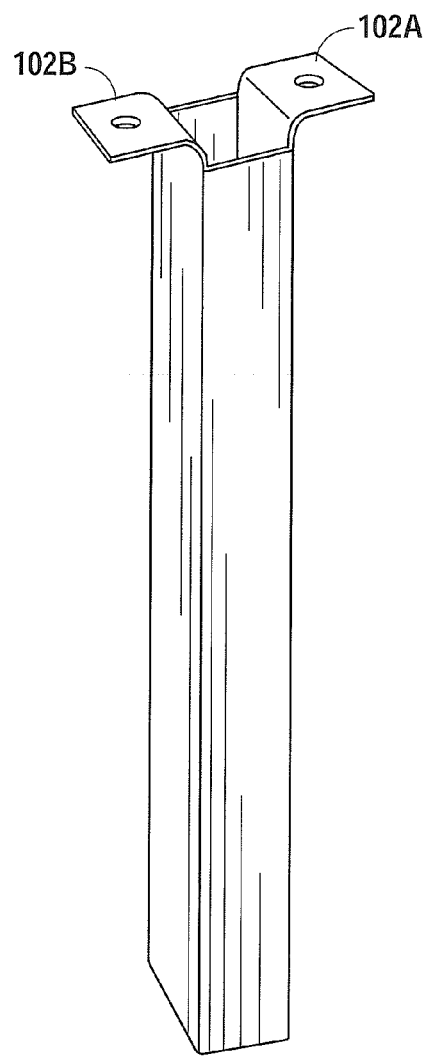
Figure 2C:
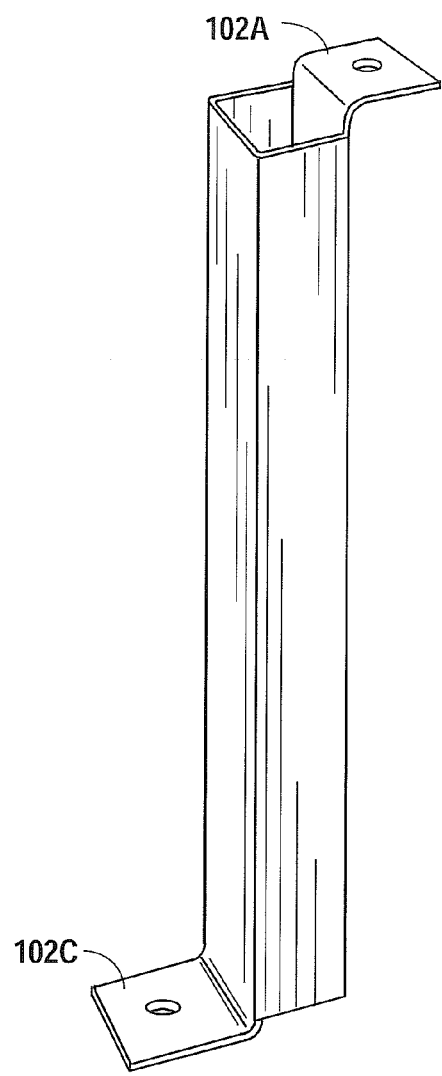

If desired, two mounting tabs 102A, 102B may be formed at the end of the extruded hollow LED module support structure 102 as shown in FIG. 2B. Alternatively, a mounting tab 102A, 102C may be formed at each end of the extruded hollow LED module support structure 102 as shown in FIG. 2C.

Figure 2D:
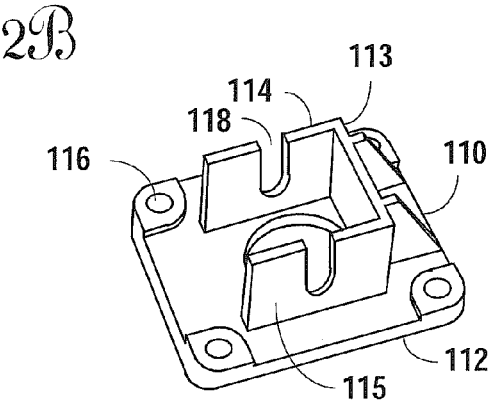
FIG. 2D is a perspective view of the three sided connector shown in FIG. 2.

Shown in FIG. 2, the upper end of the extruded hollow LED module support structure 102 is connected to the raceway 406 of the cabinet sign 400 using a mounting tab 102A and a threaded fastener 104. The bottom of the extruded hollow LED module support structure 102 may be positioned on top of the raceway 406 with a three-sided connector 110 as shown in FIG. 2D. The three-sided connector 110 is attached to the top of the raceway 406 with threaded fasteners which pass through holes 116 formed in the base portion 112 of the three-sided connector 110. Slots 118 in two sides 114, 115 of the three sides 113, 114, 115 of three-sided connector 110 enable securing the extruded hollow LED module support structure 102 to the three-sided connector 110 with a threaded fastener if desired.

Shown in FIG. 3 is a second version 150 of the first embodiment 100 using a substantially square hollow extrusion 102. As indicated above, the raceway 406 and the fluorescent lamp sockets 410 contained therein may be left in the cabinet sign 400. The second version 150 of the first embodiment 100 connect to the interior portion of the fluorescent lamp sockets 410 which remain in the raceway 406 to engage the extruded hollow LED module support structure 102 as shown in FIG. 4.

As in the first version of the first embodiment 100, the main structural portion is a substantially square extruded hollow LED module support structure 102. As shown in FIG. 3, at the bottom end is an adapter 160 having a portion 162 which fits into the hollow portion of the extruded hollow LED module support structure 102, as shown in FIG. 3A. At the other end of the adapter 160 is a substantially rectangular opening 166. This substantially rectangular opening 166 is sized to fit around the protrusion found in the center of fluorescent lamp sockets 410. Along the sides of the adapter 160 shown in FIG. 3A are wire channels 164 for the wires which provide electrical energy to the LED modules 500 mounted on the sides of the extruded hollow LED module support structure 102. The engagement of the adapter 160 shown in FIG. 3A with the interior of the fluorescent lamp socket 410 is shown in FIG. 4.

Shown in FIG. 3B is an alternate shape for the adapter 180 which may be used to fit into the hollow portion of hollow LED module support structure 102. Like the adapter 160 shown in FIG. 3A, there is a portion 182 which engages the hollow portion of the hollow LED module support structure 102. On the opposite end is an opening 186 to accommodate the protrusion found in the interior of a fluorescent lamp socket 410. Surrounding the opening 186 is a substantially D-shaped form 188 which may be used to fit within the D-shaped found in the interior of some fluorescent lamp sockets 410.

Also shown in second version 150 of the first embodiment 100 in FIG. 3 is a sleeve assembly 170 which both covers the wires extending between the LED modules 500 and holds the LED modules 500 to the extruded hollow LED module support structure 102. The construction of this sleeve assembly 170 is shown in FIG. 5. Surrounding three sides of the extruded hollow LED module support structure 102 is a substantially U-shaped portion 172. Shown in FIG. 5A are the channels 174 formed on the top portion of the substantially U-shaped portion 172. These channels 174 enable the plate 176 shown in FIG. 5B to slide therein to cover the wires between the LED modules 500.

The top end of the second version 150 of the first embodiment 100 is shown in FIG. 6. Therein a substantially hollow cone 152 is used to contact the outer portion of the fluorescent lamp socket 410. The substantially hollow cone 152 is connected to the extruded hollow LED module support structure 102 in the same way as the adapters 160 shown in FIG. 3A and FIG. 3B. Specifically, a block portion 154, as shown in FIG. 6A, is inserted into the hollow portion of the extruded hollow LED module support structure 102.

Those of ordinary skill in the art will understand that the extruded LED module support structure 102 may be attached to the raceways 406 using mounting tabs, or a three sided connector 110 such as shown in FIG. 2D. Alternatively, the extruded hollow LED module support structure 102 may engage the interior of a fluorescent lamp socket 410 using an adapter 160 as shown in FIG. 3A or adapter 180 as shown in FIG. 3B. Also, the extruded hollow module support structure 102 may engage the exterior of a fluorescent lamp socket using a hollow cone 152 as shown in FIG. 6A.

In some prior art cabinet signs, an extremely long linear fluorescent lamp may have been used. Herein it may be necessary to use to multiple sections of the extruded hollow LED module support structure 102. If so, a structure as shown in FIG. 7 is employed. Inserted into the hollow portion of each section of the extruded hollow LED module support structures 102 is a block 190 as shown in FIG. 7A. In the center section of the block 190 is central portion 192 whose outside perimeter substantially matches the outside perimeter of the extruded hollow LED module support structure 102. For additional strength, it has been found that the sleeve assembly 170, shown in FIG. 5, may be placed around each end of the extruded hollow LED module support structure 102 sections and the block 190 therebetween.

The second embodiment 200 of the disclosed system shown in FIG. 8 is similar to the first embodiment of the disclosed system shown in FIG. 2 but for the cross section of the extruded hollow LED module support structure 102 which is a substantially square or rectangular extrusion in the first embodiment 100.

The cross section of the extruded hollow LED module support structure 202 in the second embodiment 200 is that of a modified I-beam as shown in FIG. 8A and FIG. 8B which is cut substantially to the length of a linear fluorescent tube. Specifically, the modified I-beam includes a top flange 204, a bottom flange 206 and a web 208 therebetween. Formed in the web 208 is a substantially square central opening 210 that is large enough to encircle the protrusion in the middle of the interior of a fluorescent lamp socket 410. If desired, substantially V-shaped channels 212 may be formed on the outer sides of the top flange 204 and the bottom flange 206 for facilitating the drilling of holes or the insertion of self-threading fasteners.

Those of ordinary skill in the art will understand that ends of the extruded hollow LED module support structure 202 will enable the formation of mounting tabs 102A, 102B, and 102C as shown above in FIGS. 2, 2A, 2B and 2C by removing the structure between the flanges 204 and 206. Alternatively, the extruded hollow LED module support structure 202 may be attached to the raceway 406 using a three sided connector 110 as shown in FIG. 2D. And, the extruded hollow LED module support structure 202 may engage the interior of the fluorescent lamp socket 410.

Figure 8C:
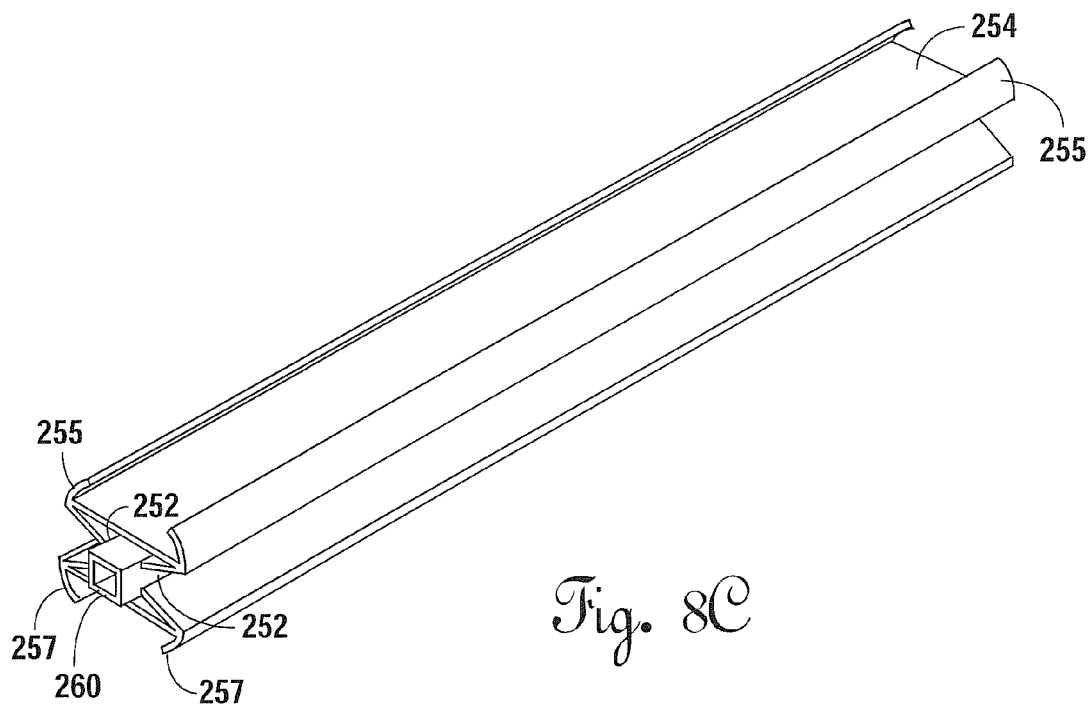
FIG. 8C is a perspective view of a second version of an extruded hollow LED module support structure.
Figure 8D:
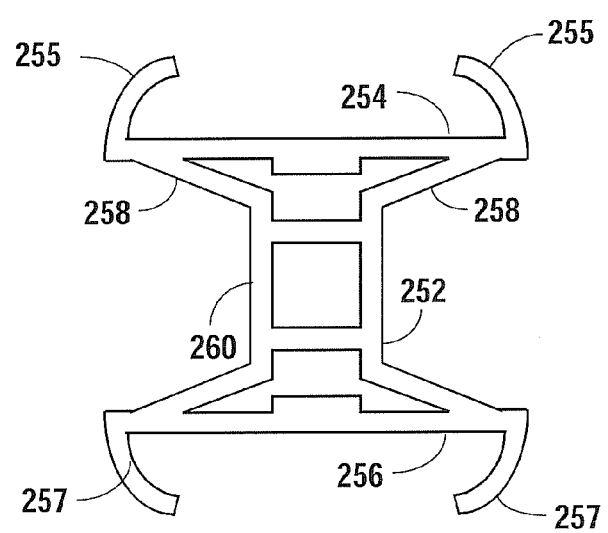
FIGS. 8D is a cross-sectional view of the extruded hollow LED module support structure shown in FIG. 8C.

Shown in FIG. 8C is a perspective view of a second version of the extruded hollow LED module support structure 252 used in the second embodiment. A cross section appears in FIG. 8D. Herein the extruded LED module includes a top flange 254, a bottom flange 256 and a double web 258 therebetween. Formed in the double web 258 is a substantially square central opening 260 that is large enough to encircle the protrusion in the middle of the interior of the fluorescent lamp socket 410. On either side 257 of the top flange 254 are quarter-arc LED module guides 255 for locating the LED module 500 on the top flange 254. Similar quarter-arc LED module guides 257 appear on either side of the bottom flange 256.

Figure 8E:
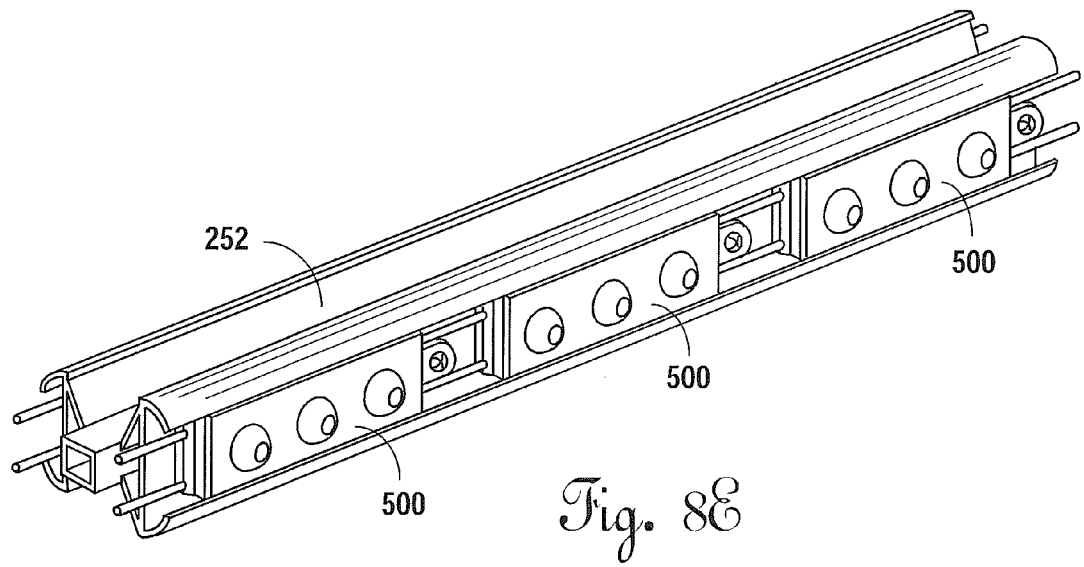
FIG. 8E is a perspective view of LED modules mounted on the extruded hollow LED module support structure shown in FIG. 8C and 8D.

Shown in FIG. 8E is a plurality of LED modules 500 mounted to the flanges 254, 256 extruded hollow module support structure 252 using threaded fasteners or adhesives. As will be understood by those of ordinary skill in the art, the LED modules 500 are electrically connected one to another with wires.

Figure 8F:
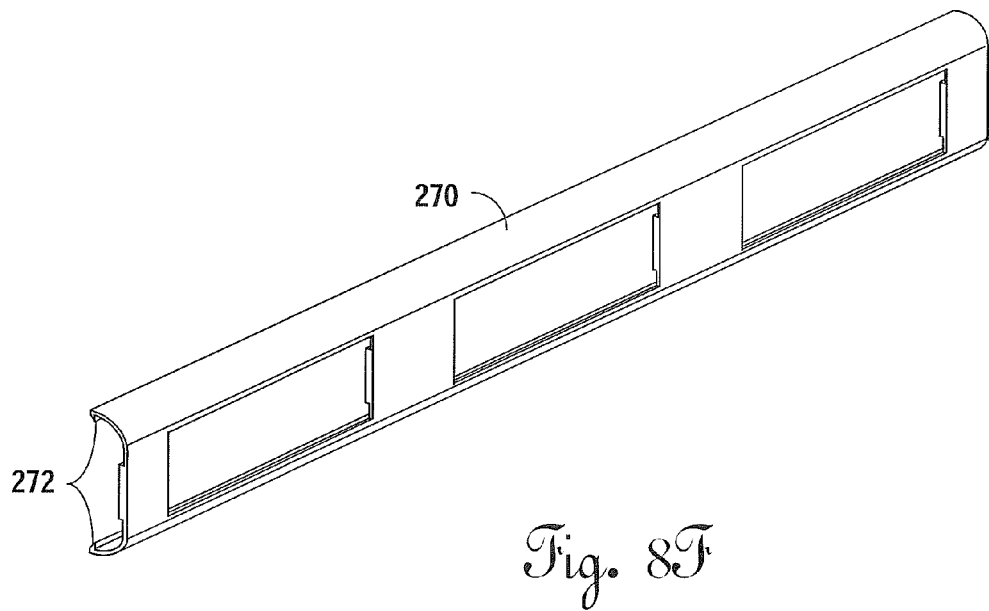
FIG. 8F is a perspective view of a cover which may be placed over the LED modules.
Figure 8G:
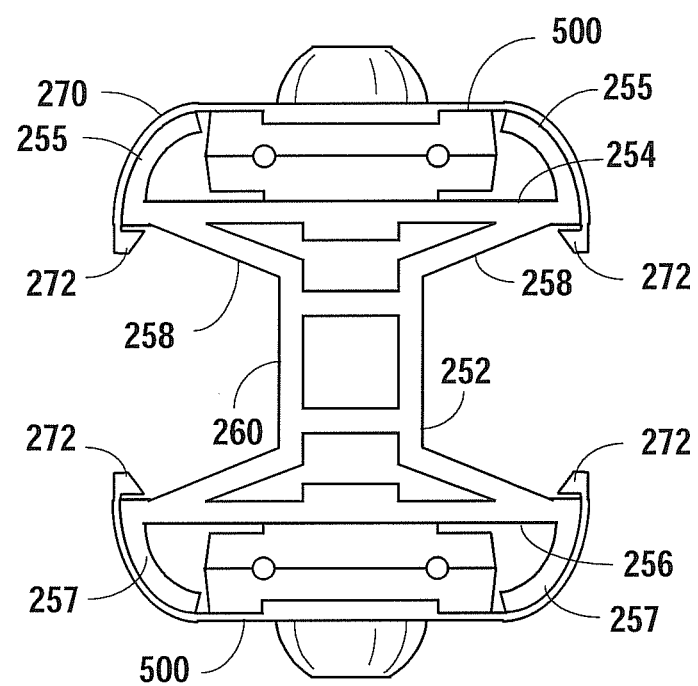
FIG. 8G is a cross sectional view similar to FIG. 8D with the cover snapped onto the extrusion over the LED module.

Shown in FIG. 8F is an optional custom cover extrusion 270 which may be placed over the extruded hollow LED module support structure 202 as shown in FIG. 8G. The optional custom cover extrusion 270 may be used to hold the LED modules 500 in place and cover the wires between the LED modules 500. The optional custom cover extrusions 270 is held in place by a snapfit 272 including a tab which snaps over the end of the flanges 254, 256 and comes to rest on the underside of the flanges 254 and 256.

When the extruded hollow LED module support structure 202, 252 is to be mounted to the raceway 406 of the prior art cabinet sign 400, as shown in FIG. 8, the mounting is similar to the mounting of the first embodiment 100. That is a top mounting tab and a bottom mounting using a three sided connector 110, as shown in FIG. 8 may be used.

Figure 9:
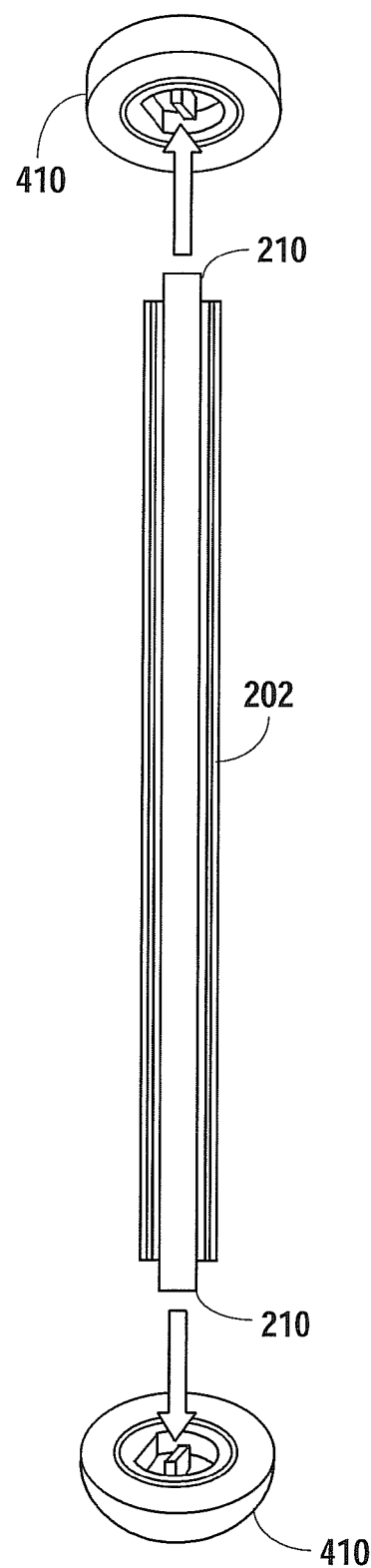
FIG. 9 is a side elevational view of the second embodiment with a portion of the flanges and web removed and placed between two fluorescent lamp sockets.

The presence of the substantially square central opening 210, 260 in the extruded hollow LED module support structure 202, 252 enables the extension of the substantially square central opening 210, 260 at the end of modified I-beam extruded hollow LED module support structure 220 by removing portions of the flanges 204, 206, 254, 256 and a portion of the web 210, 260 as shown in FIG. 9. This substantially square central opening 210 may be used to encircle the protrusion in the interior of the fluorescent lamp socket 410. Thus, the ends of the extruded hollow LED module support structure 202, 252 may be affixed to a portion of 407 (FIG. 1) of the raceway 406. Alternatively, the LED module support structure 202, 252 may be supported on either end by engagement with a fluorescent lamp socket 410 in the raceway 406.

As shown in FIG. 9, both ends of the modified I-beam extruded hollow LED module support structure 220 may be inserted into the interior of the fluorescent lamp sockets 410 if the installer elects to use the fluorescent lamp sockets 410 in the raceways 406 in the prior art cabinet sign 400.

Figure 10:
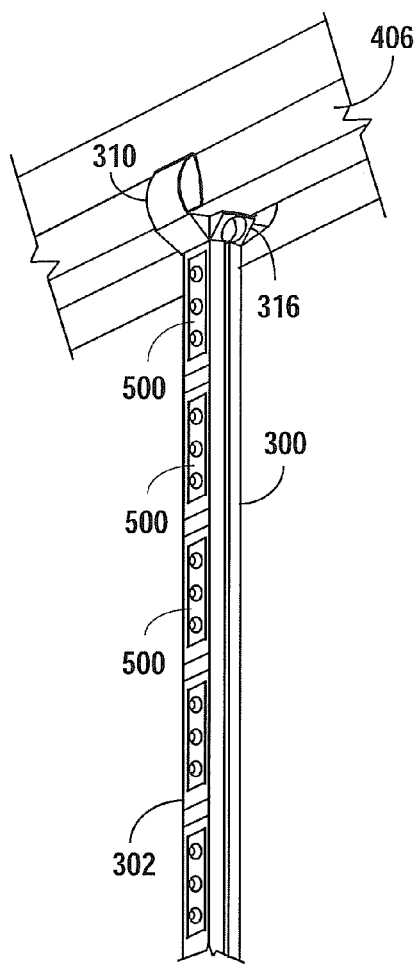
FIG. 10 is a perspective view of the third embodiment in connection with a raceway.
Figure 11:
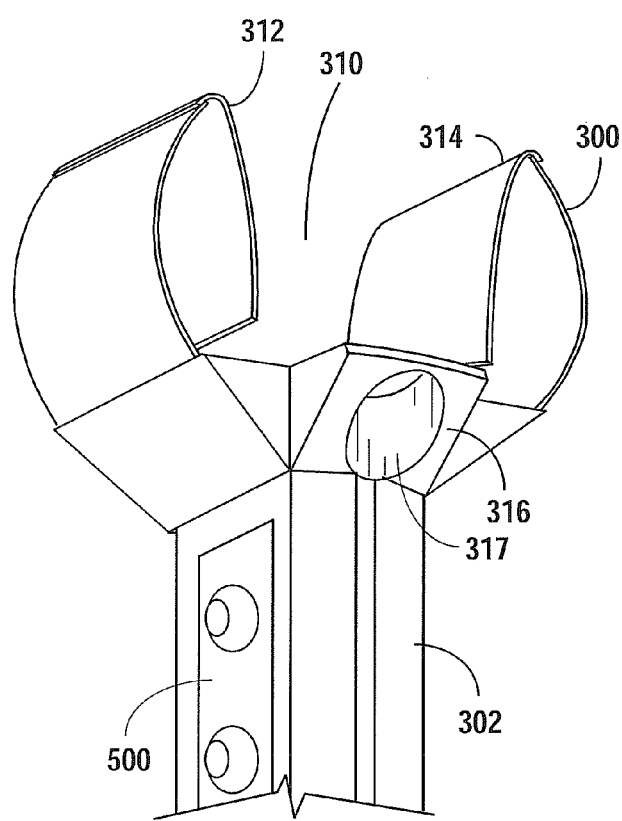
FIG. 11 is an enlarged view of the grappling yoke portion of the third embodiment.

In the third embodiment 300, shown in FIG. 10, yet another way of attaching an LED module support structure 302 to a raceway 406 is shown. As shown in FIG. 11, at the end of the LED module support structure 302 is a grappling yoke structure 310 which contacts the sides of the raceway 406 and is secured thereto with an overmolded plastic connector 316. A mounting hole 317 for use with a threaded fastener is formed on either side of the overmolded plastic connector 316.

As shown in FIG. 11, the grappling yoke structure 310 includes high coefficient of friction rubber pads 312, 314 which are mounted to that part of the grappling yoke structure 310 which contacts the sides of the raceway 406 as shown in FIG. 10. The grappling yoke structure 310 is designed so that it tends to close toward the raceway 406 when a downward force is placed on the LED module support structure 302.

Figure 12:
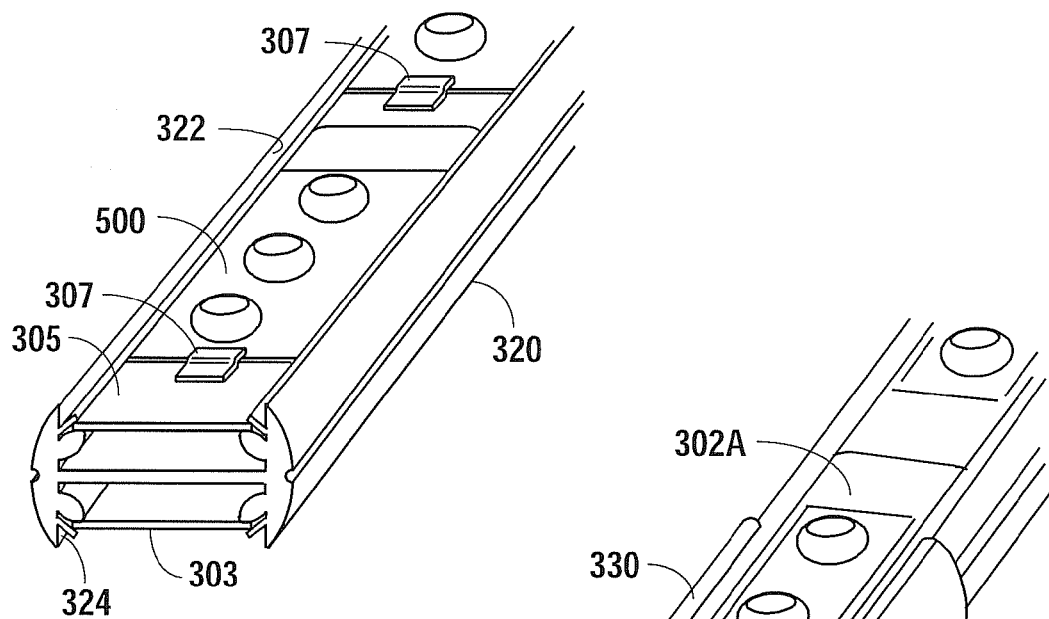
FIG. 12 is a perspective view in partial section showing the LED module support structure.

As shown in FIG. 12, strips 303, 305 shown in FIG. 11 are inserted into the opening 322, 324 of a substantially H-shaped connector 320 and held in place by pairs of protrusions formed in the sides of the substantially H-shaped connector 320. The LED modules may be attached to the strips 303, 305, using clips 307. The combination of the two formed strips 322, 324 and the substantially H-shaped connector 320 may be formed into sections 302A, 302B.

Figure 13:
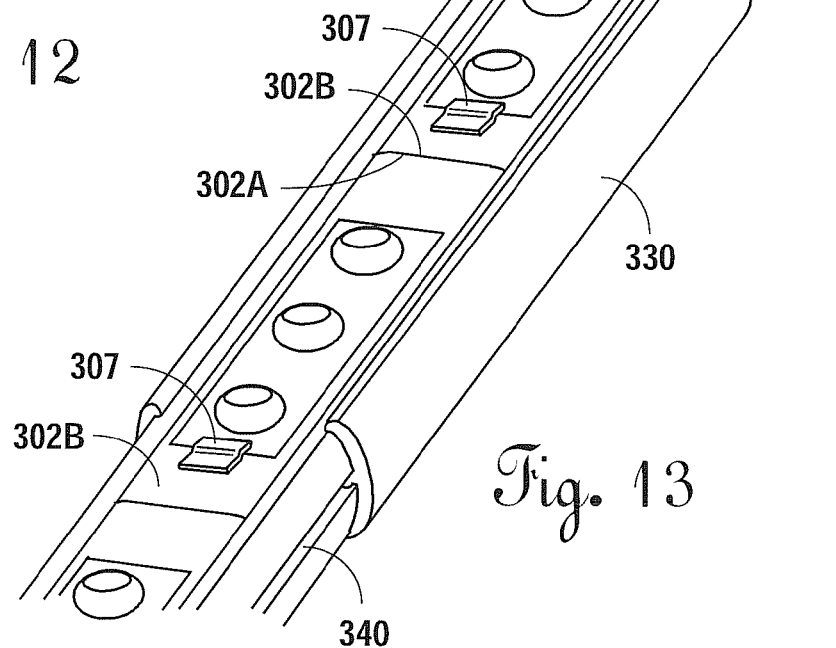
FIG. 13 is a perspective view of two sections of the LED module support structure connected one to another.
Figure 13A:
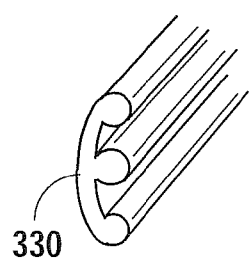
FIG. 13A is a perspective view of the extender shown in FIG. 13.

As shown in FIG. 13, these sections 302A, 302B may be connected to one another using extenders 330. The extenders 330 as shown in FIG. 13A are formed to include a substantially circular protrusion 331 which engages a channel 340 formed in the outside of the substantially H-shaped connectors 330.

The bottom of the LED module support structure 302 may be attached to the raceway 406 by forming mounting tabs 102A, 102B and 102C such as those shown in FIGS. 2, 2A, 2B and 2C.

While the disclosed retrofit system and method for replacing linear fluorescent lamps with a LED, modules have been disclosed according to preferred and alternate embodiments, those of ordinary skill in the art will understand that still other embodiments have been enabled according to the foregoing disclosure. Such other embodiments shall fall within the scope and meaning of the appended claims.

What is claimed is:

1. A system for replacing linear fluorescent lamps with LED modules in a cabinet sign having raceways, said cabinet sign being previously constructed and arranged for mounting linear fluorescent lamps in sockets between the raceways, said system comprising:
    an extruded hollow LED module support structure cut substantially to the length of a linear fluorescent lamp;
    connecting said extruded hollow LED module support structure to the raceway using one or more of the following:
    a) at least one mounting tab constructed and arranged for attachment to one or both raceways in the cabinet sign, said at least one mounting tab being formed on an end of said extruded hollow LED module support structure;
    b) a three sided connector constructed and arranged for attachment to one or both raceways in the cabinet sign, said three sided connector enabling the positioning of said extruded hollow LED module support structure within said cabinet sign; and
    c) an adapter constructed and arranged to fit within the hollow portion of said extruded hollow LED module structure on one end and engage one or both sockets for the linear fluorescent lamp on the other end.

2. The system as defined in claim 1 wherein the cross section of said extruded hollow LED module support structure is a parallelepiped.

3. The system as defined in claim 2 further including a substantially U-shaped sleeve constructed and arranged to fit around said extruded hollow LED module support structure and a plate interfitting therewith to surround said hollow LED module support structure and to cover the wires running between the LED modules.

4. The system as defined in claim 2 wherein said extruded hollow module support structure is formed in multiple sections which are connected to one another using a block which fits within the hollow portion of said hollow LED module support structure.

5. A system for replacing linear fluorescent lamps with LED modules in a cabinet sign having raceways, said cabinet sign being previously constructed and arranged for mounting linear fluorescent lamps in sockets between the raceways, said system comprising:
    an extruded hollow LED module support structure cut substantially to the length of a linear fluorescent lamp;
    connecting said extruded LED module support structure using one or more the following:
    a) at least one mounting tab constructed and arranged for attachment to one or both raceways in the cabinet sign, said at least one mounting tab being formed on an end of said extruded hollow LED module support structure;
    b) a three-sided connector constructed and arranged for attachment to one or both raceways in the cabinet sign, said three-sided connector enabling the position of said extruded hollow LED module support structure within said cabinet sign; and
    c) an engagement of an end of said extruded hollow LED module support structure with one or both of the linear fluorescent lamp sockets.

6. The system as defined in claim 5 wherein the cross section of said extruded hollow LED module mounting structure is a beam including two opposing outer flanges, a web formed therebetween and a hollow central opening formed in said web.

7. The system as defined in claim 5 wherein the cross section of said extruded hollow LED module mounting structure is a beam including two opposing outer flanges, a double web formed therebetween and a hollow central opening formed in said double web.

8. The system as defined in claim 7 wherein quarter-arc portions are formed on the outer edges of said opposing outer flanges to enable locating an LED module therebetween.

9. The system as defined in claim 8 further including a cover portion constructed and arranged for a snapfit engagement with said opposing flanges.

10. The system as defined in claim 5 wherein the engagement of an end of said extruded hollow LED support structure is with the interior of the linear fluorescent lamp socket.

11. The system as defined in claim 5 wherein the engagement of an end of said extruded hollow LED support structure is with the exterior of the linear fluorescent lamp socket.

12. The system as defined in claim 11 wherein the engagement of the exterior of said fluorescent lamp socket by an end of said extruded hollow LED support structure includes a hollow cone.

13. A system for replacing linear fluorescent lamps in a cabinet sign, said cabinet sign being previously constructed and arranged for mounting linear fluorescent lamps between raceways, said system comprising:
   an LED module support structure having a pair of strips cut substantially to the length of a linear fluorescent lamp, said pair of strips being positioned with respect to another by placement within the openings in a substantially H-shaped holder;
   wherein a spring biased grappling yoke is placed on one end of said pair of strips, said spring biased grappling yoke constructed and arranged to grasp the raceway.

14. The system as defined in claim 13 wherein each side of said spring biased grappling yoke includes a high friction covering.

15. The system as defined in claim 13 further including a plastic retaining piece overmolded over said pairs of strips, said plastic retaining piece including holes formed therein to enable connection of said plastic retaining piece to the raceway with threaded fasteners.

16. The system as defined in claim 13 further including connectors engageable with said H-shaped holder to extend the length of said LED module support structure.

17. The system as defined in claim 13 wherein the connection of the end of said strips opposite from said grappling yoke includes a tab formed on at least one of the pair of strips constructed and arranged for attachment to a raceway in the cabinet sign.

* * * * *